No. 877,181. PATENTED JAN. 21, 1908.
W. F. DZUR.
VALVE TRAP.
APPLICATION FILED AUG. 17, 1906.
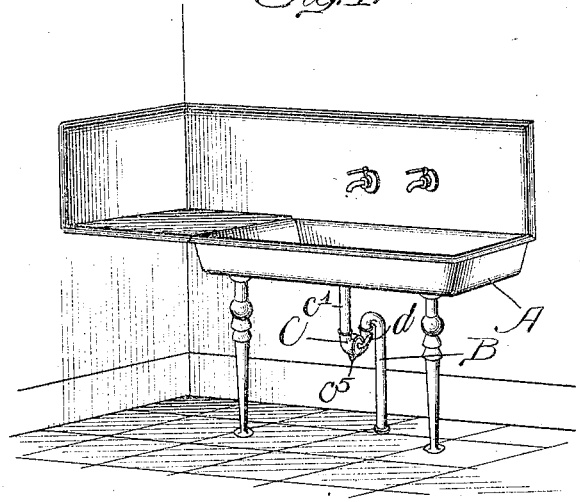
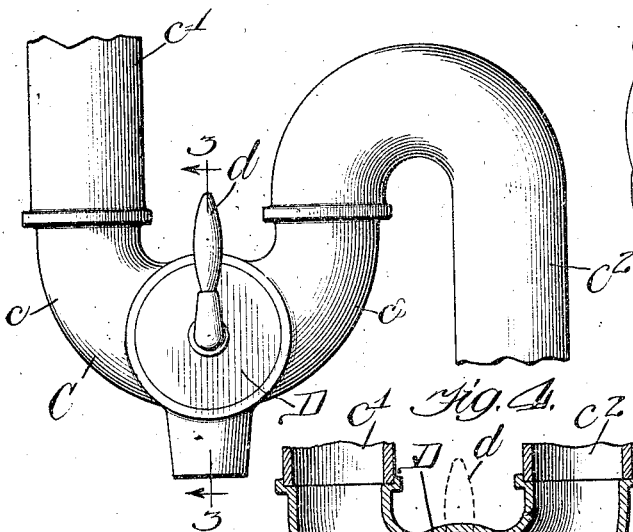
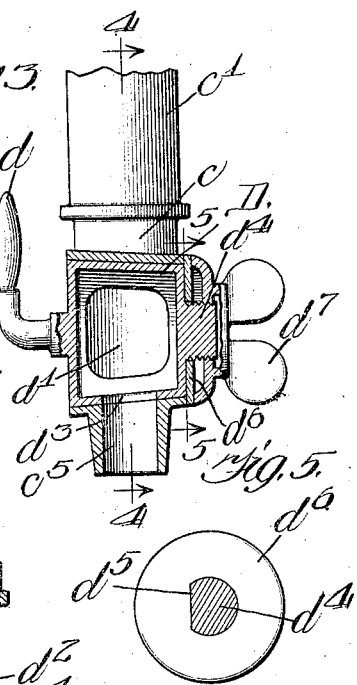
Witnesses:
Robert H. Weir
Jno. H. Nelson
Inventor:
Wm. F. Dzur
By Buckley & Durand
Attys.

UNITED STATES PATENT OFFICE.

WILLIAM F. DZUR, OF CHICAGO, ILLINOIS.

VALVE-TRAP.

No. 877,181.　　　　　Specification of Letters Patent.　　　　　Patented Jan. 21, 1908.

Application filed August 17, 1906. Serial No. 330,963.

*To all whom it may concern:*

Be it known that I, WILLIAM F. DZUR, a citizen of the United States of America, and resident of Chicago, Illinois, have invented a certain new and useful Improvement in Valve-Traps, of which the following is a specification.

My invention relates to traps or water seals of the kind employed largely in connection with sinks, basins and general house plumbing, to keep sewer gas from entering the house. It has been proposed to provide traps of this character with valves by which the sewer connections can be shut off and the trap drained. In my improved trap, however, there is but a single three-way valve, and the axis of rotation of said valve is horizontal. With this arrangement and construction, the sewer gas can be cut off and the trap drained by a single turn of the valve, and accumulations within the valve are easily and effectively discharged therefrom.

The nature and advantages of my invention will, however, hereinafter more fully appear.

In the accompanying drawings, Figure 1 shows a valve-trap embodying the principles of my invention, and illustrates the application of the same to an ordinary sink. Fig. 2 is an enlarged side elevation of the trap. Fig. 3 is a vertical section on line 3—3 in Fig. 2. Fig. 4 is a vertical section on line 4—4 in Fig. 3. Fig. 5 is a detail section on line 5—5 in Fig. 3.

The sink A can, of course, be of any suitable known or approved character, and the off-take or sewer pipe B leads therefrom in the usual and well-known manner. The trap C is located in the said pipe, and arranged below the sink in the usual and well-known manner. The said trap comprises a curved and U-shaped coupling or pipe portion $c$. The pipe $c^1$ leads from the sink to the said U-shaped section of the pipe. The pipe $c^2$ leads from the said U-shaped or curved coupling or pipe section. As thus constructed, the trap is of the form ordinarily known as an S-trap, although for the broader purposes of my invention the trap may be of other well-known forms.

In the lower portion of the U-shaped pipe section C, a horizontal valve D is arranged and provided with an operating handle $d$. This horizontal valve is hollow, and provided with two relatively large openings or ways $d^1$ and $d^2$, adapted to register with the corresponding openings $c^3$ and $c^4$ in the pipe coupling $c$. The said valve is also preferably tapered and arranged to rotate about a horizontal axis, and provided with a third opening or way $d^3$ adapted to register with the drip or drain opening $c^5$ at the bottom of the said U-shaped pipe coupling. The other end of the said valve is provided with a threaded portion $d^4$, which is preferably flattened at $d^5$ to fit a correspondingly shaped hole in the washer $d^6$. The wing nut $d^7$ is applied to the outer end of said threaded portions $d^4$, and screws upon the said washer. With this arrangement the washer and wing nut turn or rotate when the valve is rotated.

As shown in Fig. 4, the drip or drain opening $c^5$ is open, and any water or accumulations in the trap can discharge therefrom through the valve-opening or way $d^3$. If the handle be swung to the right, the opening $d^2$ will then be brought into register with the opening $c^5$, and the drain opening or drip $c^5$ will still be open, but the communication or connection with the sewer will be completely shut off. Again, should the handle be brought to a position where it points directly downward, so that it is in a position opposite to that shown in the drawings, a clear passage will then be afforded through the trap for the discharge of water from the sink, but the drip or drain opening $c^5$ will be closed. Thus it is possible to drain from both sides of the valve, to drain from only one side thereof, and to shut off the sewer gas and open the drain. The valve can also, of course, be used for shutting off the sink and opening the drain. All this is accomplished by a single three-way valve, and, furthermore, the horizontal arrangement of the valve enables it to shake up or turn over any accumulations which may form therein, thus effecting a more satisfactory discharge of the same through the drain opening $c^5$. With a valve-trap of this character, I find that the construction and manufacture are cheaper, and that in practice its use is more satisfactory than those heretofore employed. As the drip or drain opening discharges or drains outside of the sewer pipe, no sewer gas can enter the house through the drain opening when the latter is open and the sewer pipe cut off.

What I claim as my invention is:

1. In a device of the class specified, a trap or water seal provided with a general discharge passage and a drip or drain opening, an off-take or sewer pipe, and a rotary three-way valve controlling said passage and opening, a second pipe leading into the trap said valve rotatable about a horizontal axis, adapted to entirely cut off the off-take or sewer pipe and leave the trap and second pipe free to drain said drip or drain opening adapted to discharge outside of the sewer pipe and directly into the room in which the said device is located.

2. In a device of the class specified, the combination of a trap comprising a U-shaped pipe section adapted to hold a suitable quantity of water for effecting a water seal, said pipe section provided with a general discharge passage and a lower drip or drain opening, an off-take or sewer pipe, a rotatable hollow valve provided with three lateral openings, two of said openings adapted to maintain the open condition of the said general discharge passage at the same time that the third opening is in communication with the said drip or drain opening at the bottom of the U-shaped pipe section, off-take pipe, a second pipe leading to the trap a handle on said valve, and screw-threaded means for drawing and holding the valve in place, said valve rotatable about a horizontal axis, adapted to entirely cut off the off-take or sewer pipe and leave the trap and second pipe free to drain, said drip or drain opening adapted to discharge outside of the sewer pipe and directly into the room in which the said device is located, substantially as and for the purpose set forth.

3. In a sink-trap, a sink-pipe, a sewer pipe, a trap or water seal between the two pipes, a drip or drain opening, for draining the sink outside of the sewer pipe, and a single three-way valve adapted to cut the sewer pipe off entirely from the sink and drain opening and leave the sink free to drain.

4. In a sink-trap, the combination of a sink-pipe, a sewer pipe, a trap or water seal between the two pipes, a drip or drain opening, for draining the sink outside of the sewer pipe, and a single rotary hollow valve provided with three lateral openings adapting the valve for adjustment to cut the sewer pipe off entirely from the sink and drain opening and leave the sink free to drain.

5. In a sink-trap, the combination of a sink-pipe, a sewer pipe, a trap or water seal between the two pipes, a drip or drain opening, for draining the sink outside of the sewer pipe, and a single rotary valve adapted to be rotated to connect the sink pipe with the sewer pipe and close the drain opening, adapted by another adjustment to open the drain and maintain communication between the two pipes, by a further rotation to entirely cut off the sewer pipe and leave the sink free to drain, and by another adjustment to entirely cut off the sink and open communication between the drain and the sewer pipe.

6. In a sink-trap, sink-pipe, a sewer pipe, a trap or water seal between the two pipes, a drip or drain opening, for draining the sink outside of the sewer pipe, and a single valve adapted to rotate about a horizontal axis to completely cut off the sewer pipe and leave the sink free to drain.

7. In a sink-trap, a sink-pipe, a sewer pipe, a trap or water seal between the two pipes, a drip or drain opening, for draining the sink outside of the sewer pipe, and a single valve adapted to be rotated to completely cut off the sewer pipe and leave the sink free to drain.

8. A sink trap provided with a single rotary valve having provisions for entirely cutting off the sewer from the sink and leaving the latter free to drain, outside of the sewer.

Signed by me at Chicago, Cook county, Illinois, this 15th day of August, 1906.

WILLIAM F. DZUR.

Witnesses:
ALBERT JOHN SAUSER,
S. LEWIS.